US011165268B2

(12) United States Patent
Sethi et al.

(10) Patent No.: US 11,165,268 B2
(45) Date of Patent: Nov. 2, 2021

(54) CHARGE/DISCHARGE-PATTERN BATTERY TRAINING SYSTEM

(71) Applicant: Dell Products L.P., Round Rock, TX (US)

(72) Inventors: Parminder Singh Sethi, Punjab (IN); Vaideeswaran Ganesan, Ka (IN); Lakshmi Narasimhan Mc, Potong Pasir (SG); Tamilchelvan Bhuvaneswari, Potong Pasir (SG); Liane Ghosh, Bangalore (IN); Avinash V. Patil, Gulabrga (IN)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 16/399,634

(22) Filed: Apr. 30, 2019

(65) Prior Publication Data

US 2019/0348850 A1 Nov. 14, 2019

Related U.S. Application Data

(63) Continuation-in-part of application No. 15/974,761, filed on May 9, 2018, now Pat. No. 10,658,861.

(51) Int. Cl.
*H02J 7/00* (2006.01)
*H02J 7/02* (2016.01)
*G06F 1/28* (2006.01)

(52) U.S. Cl.
CPC ............. *H02J 7/0068* (2013.01); *G06F 1/28* (2013.01); *H02J 7/0047* (2013.01); *H02J 7/0072* (2013.01); *H02J 7/025* (2013.01)

(58) Field of Classification Search
None
See application file for complete search history.

(56) References Cited

U.S. PATENT DOCUMENTS 5,254,928 A 10/1993 Young et al.
6,424,123 B1 7/2002 Odaohhara et al.
(Continued)

OTHER PUBLICATIONS

Chabalko et al. (2017), Quasistatic Cavity Resonance for Ubiquitous Wireless Power Transfer. PLoS ONE 12(2): e0169045. https://doi.org/10.1371/journal.pone.0169045. (Year: 2017).*
(Continued)

*Primary Examiner* — David V Henze-Gongola
(74) *Attorney, Agent, or Firm* — Joseph Mencher

(57) ABSTRACT

A charge/discharge pattern battery training system includes a battery subsystem connected to a battery charging subsystem, and a battery charging determination engine coupled to the battery charging subsystem. The battery charging determination engine monitors a plurality of charge/discharge cycles performed by the battery subsystem and, based on the plurality of charge/discharge cycles performed by the battery subsystem, identifies a first charge/discharge pattern exhibited by the battery subsystem. The battery charging determination engine then determines a charging schedule that will cause the battery subsystem to exhibit a second charge/discharge pattern that is different than the first charge/discharge pattern, and applies the charging schedule via the battery charging subsystem to the battery subsystem that causes the battery subsystem to exhibit the second charge/discharge pattern. The battery charging determination engine may also retrieve user scheduling information that is associated with a use of the battery subsystem in order to determine the charging schedule.

20 Claims, 4 Drawing Sheets

(56) References Cited

U.S. PATENT DOCUMENTS

| | | | |
|---|---|---|---|
| 7,570,015 B2 | 8/2009 | Bansal et al. | |
| 7,888,913 B1* | 2/2011 | Marty | H02J 7/0069 |
| | | | 320/132 |
| 8,380,999 B1* | 2/2013 | Robison | H04W 52/0261 |
| | | | 713/300 |
| 2010/0123436 A1* | 5/2010 | Herrod | H02J 7/00 |
| | | | 320/132 |
| 2011/0018679 A1 | 1/2011 | Davis et al. | |
| 2014/0055087 A1* | 2/2014 | Causey | H02J 7/025 |
| | | | 320/108 |

OTHER PUBLICATIONS

Parminder Singh Sethi, Bhuvaneswari Tamilchelvan, Lakshmi Narasimhan Mc, "System and Method for Managing a Rechargeable Battery Based on Historical Charging Data," Filed on May 9, 2018, 26 Pages, U.S. Appl. No. 15/974,761.

* cited by examiner

CHARGE/DISCHARGE-PATTERN BATTERY TRAINING SYSTEM

CROSS-REFERENCE TO RELATED APPLICATIONS

This is a Continuation-In-Part application to U.S. Utility application Ser. No. 15/974,761 filed on May 9, 2018, entitled "System And Method For Managing A Rechargeable Battery Based On Historical Charging Data,", the disclosure of which is incorporated herein by reference in its entirety.

BACKGROUND

The present disclosure relates generally to information handling systems, and more particularly to training battery in an information handling system to exhibit a desired charge/discharge pattern.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, laptop/notebook computing devices, tablet computing devices, mobile phones, and/or other portable electronics devices known in the art, are provided with batteries for use in powering those devices when they are not directly connected to a power supply (e.g., via a power adapter/power cable system.) As such, those batteries must be periodically charged so that they may discharge their power to the device to provide for its operation when it is not directly connected to a power supply. However, battery charge and discharge patterns are not linear, and tend to differ based on the battery technology. As discussed in U.S. patent application Ser. No. 15/974,761, filed on May 9, 2018 and the disclosure of which is incorporated herein by reference, inventors of the present disclosure found that the charging pattern applied to a battery effects the discharge pattern exhibited by that battery, as batteries "learn" repeated charge/discharge patterns. Furthermore, batteries will tend to fall back on learned discharge pattern behavior, and it was been found that batteries take on average approximately three charge cycles to learn a new charge/discharge pattern. Conventional devices do not take into account learned battery charge/discharge behavior, and thus a user may wish to use their device in a manner that is outside of its batteries learned charge/discharge pattern, but the lack of awareness and/or consideration of the batteries current charge/discharge behavior may prevent even a charge of the battery to 100% battery capacity from providing the desired battery life that will enable that desired use.

Accordingly, it would be desirable to provide an improved battery charging system.

SUMMARY

According to one embodiment, an Information Handling System (IHS) includes a processing system; and a memory system that is coupled to the processing system and that includes instructions that, when executed by the processing system, cause the processing system to provide a battery charging determination engine that is configured to: monitor a plurality of charge/discharge cycles performed by a battery subsystem; identify, based on the plurality of charge/discharge cycles performed by the battery subsystem, a first charge/discharge pattern exhibited by the battery subsystem; determine a charging schedule that will cause the battery subsystem to exhibit a second charge/discharge pattern that is different than the first charge/discharge pattern; and apply, via a battery charging subsystem that is connected to the battery subsystem, the charging schedule to the battery subsystem that causes the battery subsystem to exhibit the second charge/discharge pattern.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O)

devices, such as a keyboard, a mouse, touchscreen and/or a video display. The information handling system may also include one or more buses operable to transmit communications between the various hardware components.

Figure 1:
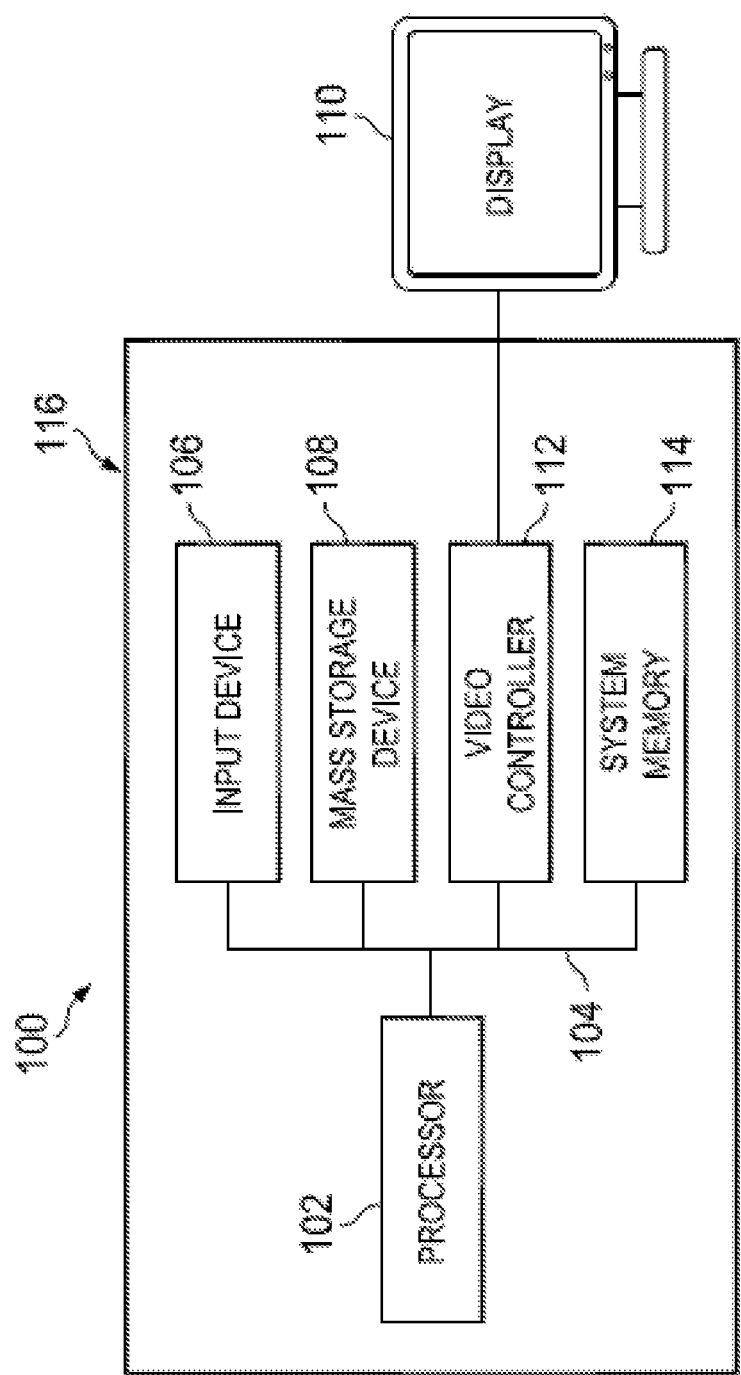
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
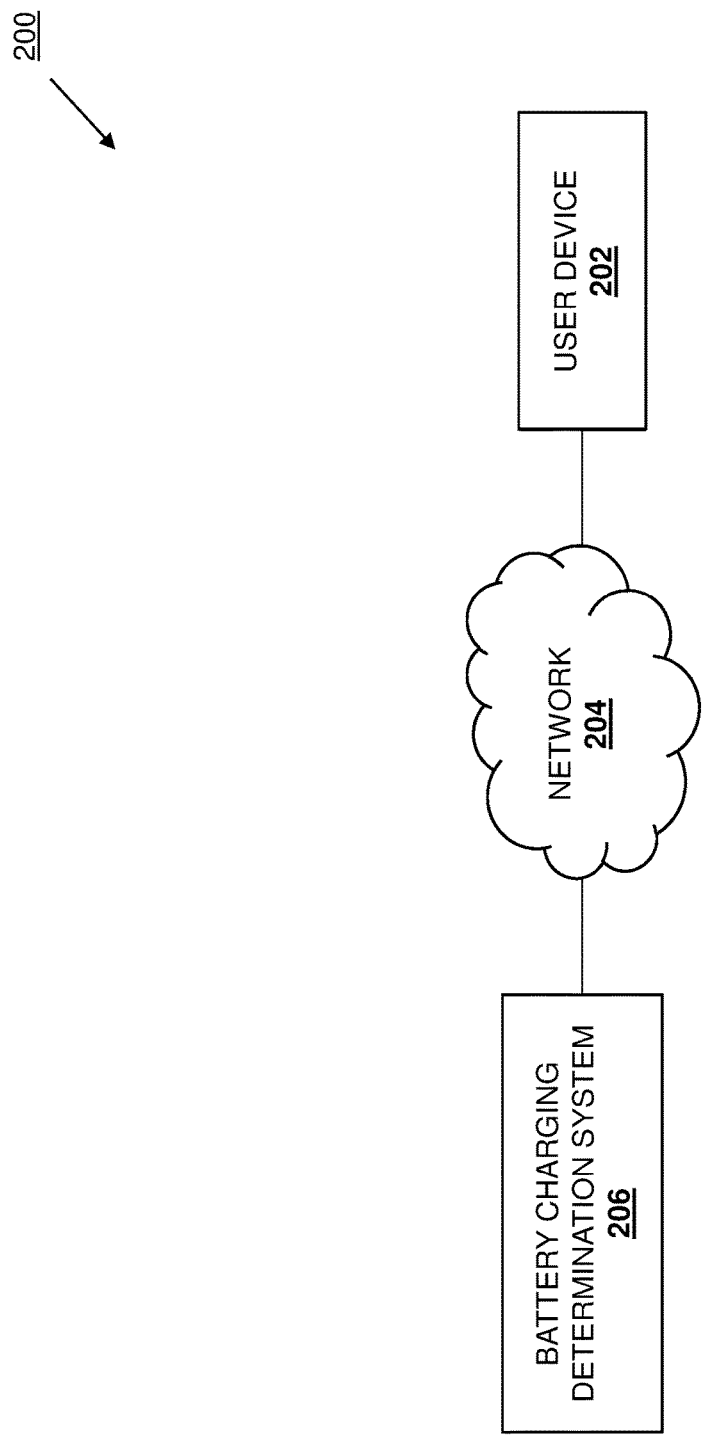
FIG. 2 is a schematic view illustrating an embodiment of a networked system that may be utilized to provide the charge/discharge pattern battery training system of the present disclosure.

Referring now to FIG. 2, an embodiment of a networked system 200 is illustrated that may provide the charge/discharge pattern battery training system of the present disclosure in some of the examples described below. In the illustrated embodiment, the networked system 200 includes a user device 202. In an embodiment, the user device 202 may be provided by the IHS 100 discussed above with reference to FIG. 1, and/or may include some or all of the components of the IHS 100. In specific examples, the user device 202 may be provided by a laptop/notebook computing device, a tablet computing device, a mobile phone, and/or a variety of portable devices that would be apparent to one of skill in the art in possession of the present disclosure. However, while illustrated and discussed as a portable user device, one of skill in the art in possession of the present disclosure will recognize that the user device 202 provided in the networked system 200 may include any battery powered device that may be configured to operate similarly as discussed below. In the illustrated embodiment, the user device 202 is coupled to a network 204 that may be provided by, for example, the Internet, a Local Area Network (LAN), and/or a variety of other networks known in the art.

In the illustrated embodiment, a battery charging determination system 206 is coupled through the network 204 to the user device 202. The battery charging determination system 206 may be provided by the IHS 100 discussed above with reference to FIG. 1, and/or may include some or all of the components of the IHS 100. In some of the specific examples discussed below, the battery charging determination system 206 is provided by one or more server devices that are configured to operate in conjunction with the user device 202 to provide for the battery charging functionality described herein. However, while illustrated and discussed as a server device, one of skill in the art in possession of the present disclosure will recognize that the battery charging determination system 206 may be provided in the networked system 200 by a variety of devices that may be configured to operate similarly as discussed below. Furthermore, in some embodiments, the battery charging determination system 206 and the network 204 may be omitted, with the user device 202 configured to perform the battery charging functionality described below without the need for the network-connected battery charging determination system 206 illustrated in FIG. 2. While a specific networked system 200 has been illustrated and described, one of skill in the art in possession of the present disclosure will recognize that the battery charging determination system of the present disclosure may include a variety of components and component configurations while remaining within the scope of the present disclosure as well.

Figure 3:
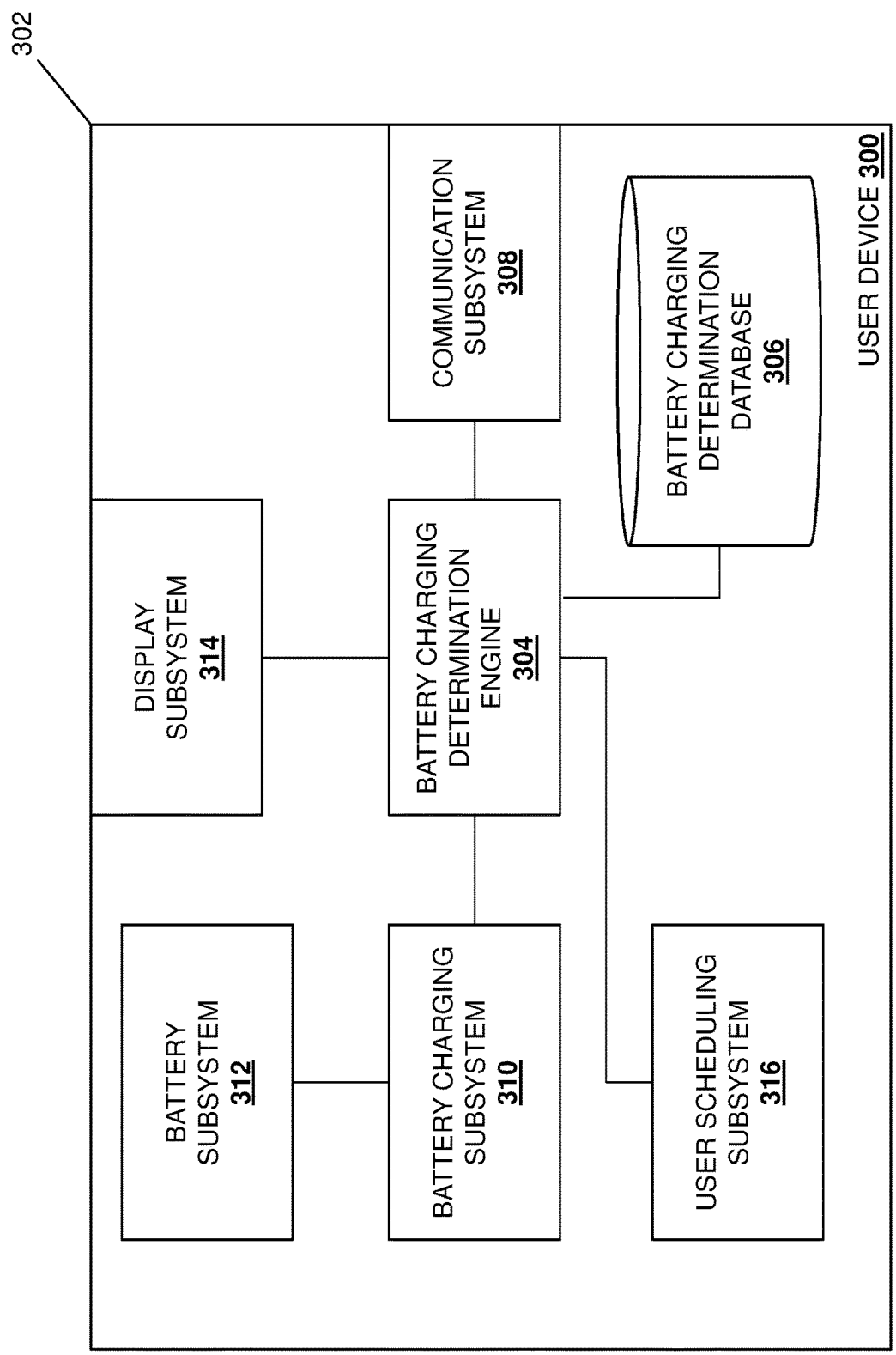
FIG. 3 is a schematic view illustrating an embodiment of a user device that may be included in the networked system of FIG. 2, and/or that may include the charge/discharge pattern battery training system of the present disclosure.

Referring now to FIG. 3, an embodiment of a user device 300 is illustrated that may provide the user device 202 discussed above with reference to FIG. 2. As such, the user device 300 may be provided by the IHS 100 discussed above with reference to FIG. 1 and/or may include some or all of the components of the IHS 100, and in specific examples may be provided by a laptop/notebook computing device, a tablet computing device, a mobile phone, and/or a variety of portable devices that would be apparent to one of skill in the art in possession of the present disclosure. However, while illustrated and discussed as a portable user device, one of skill in the art in possession of the present disclosure will recognize that the user device 202 may include any battery powered device that may be configured to operate similarly as discussed below. In the illustrated embodiment, the user device 300 includes a chassis 302 that houses the components of the user device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a battery charging determination engine 304 that is configured to perform the functionality of the battery charging determination engines and/or user devices discussed below. Furthermore, as discussed above, in some embodiments the battery charging determination engine 304 may operate independently to perform the battery charging determination functionality discussed below, while in other embodiments the battery charging determination engine 304 may operate in conjunction with the network-connected battery charging determination system 206 illustrated in FIG. 2 to perform the battery charging determination functionality discussed below.

The chassis 302 may also house a storage system (not illustrated, but which may include the storage 108 discussed above with reference to FIG. 1) that is coupled to the battery charging determination engine 304 (e.g., via a coupling between the storage system and the processing system) and that includes a battery charging determination database 306 that is configured to store any of the information utilized by the battery charging determination engine 304 discussed below. The chassis 302 may also house a communication system 308 that is coupled to the battery charging determination engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

The chassis 302 may also house a battery charging subsystem 310 that is coupled to the battery charging determination engine 304 (e.g., via a coupling between battery charging subsystem 310 and the processing system) and that may be provided by a wired charging subsystem or a wireless charging subsystem. For example, when provided by a wired charging subsystem, the battery charging subsystem 310 may include a connector that is configured to couple through a power cable, power adapter, and/or other wired power components to a power supply (e.g., an Alternating Current (AC) power supply). In another example, when provided by a wireless charging subsystem, the battery charging subsystem 310 may include a quasistatic cavity resonance receiver device that is configured to wirelessly receive power from a quasistatic resonance transmitter device that is coupled to a power supply, and/or other wireless power components that one of skill in the art in possession of the present disclosure would recognize as providing for the wireless transmission of power. In the illustrated embodiment, a battery subsystem 312 is connected to the battery charging subsystem 310, and one of skill in the art in possession of the present disclosure will recognize that the battery subsystem 312 may include any of a variety of battery components that are configured to be recharged via the battery charging subsystem 310. Furthermore, while not illustrated, one of skill in the art in possession of the present disclosure will recognize that the battery subsystem 312 may be configured (e.g., by various components, connections, and couplings) to discharge power to components in the user device 200.

The chassis 302 may also house a display subsystem 314 that is coupled to the battery charging determination engine 304 (e.g., via a coupling between display subsystem 314 and the processing system) and that may include any of a variety of display devices and/or other components that are configured to display any of the information generated and/or provided by the battery charging determination engine 304 in the manners discussed below. In the illustrated embodiment, the chassis 302 also houses a user scheduling subsystem 316 that is coupled to the battery charging determination engine 304 (e.g., via a coupling between user scheduling subsystem 316 and the processing system) and that may include applications and/or other subsystems that are associated with the user scheduling information discussed below that is indicative of the future use of the user device 300. For example, the user scheduling subsystem 316 may include a user calendar application in which a user of the user device 300 provides user scheduling information that is indicative of a future use of the user device 300 (e.g., meetings, travel details such as plane flights, blocks of time dedicated to work, etc.) While a specific user device 300 has been illustrated, one of skill in the art in possession of the present disclosure will recognize that user devices (or other devices operating according to the teachings of the present disclosure in a manner similar to that described below for the user device 300) may include a variety of components and/or component configurations for providing conventional user device functionality, as well as the functionality discussed below, while remaining within the scope of the present disclosure as well.

Figure 4:
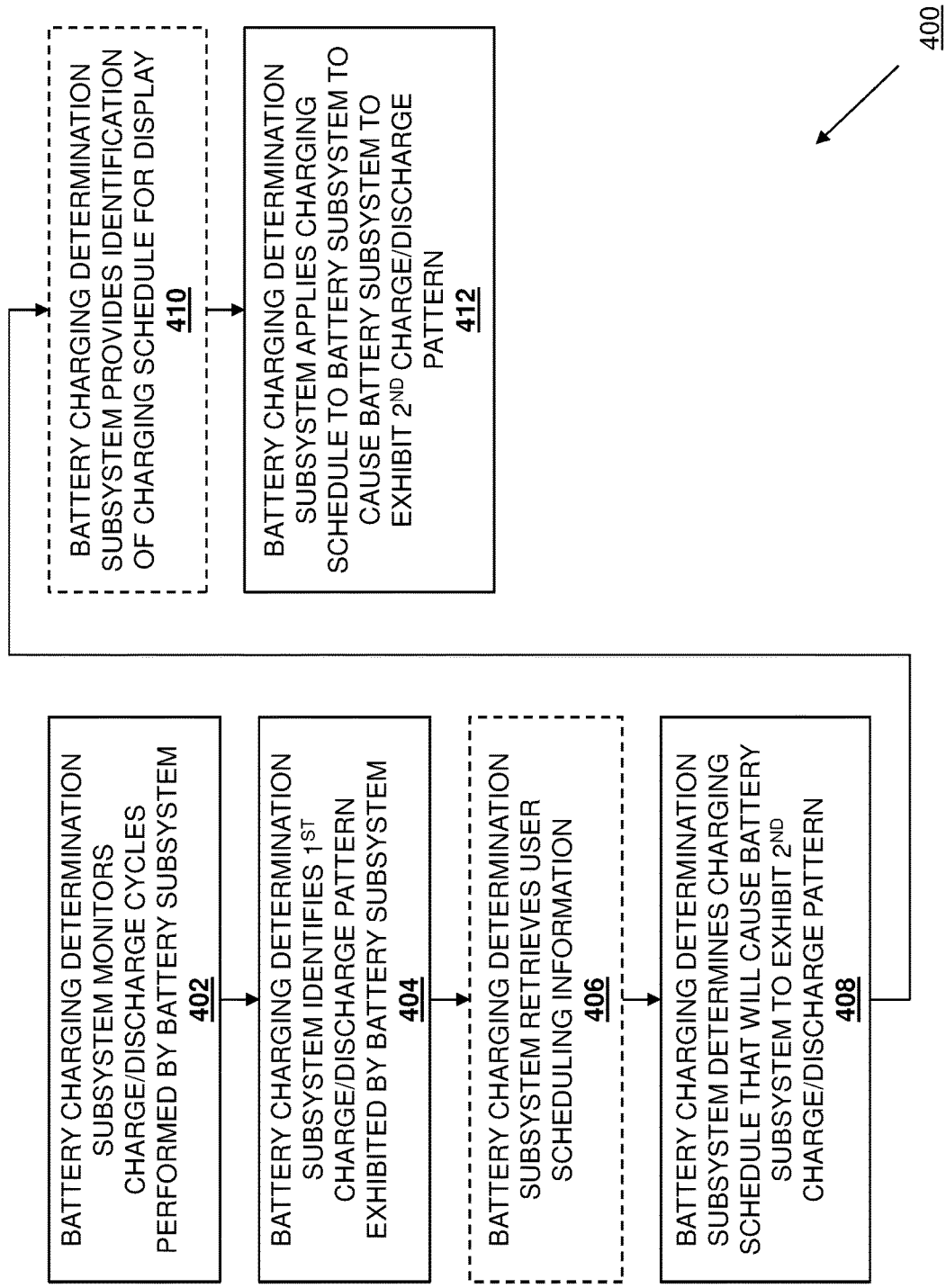
FIG. 4 is a flow chart illustrating an embodiment of a method for training a battery to exhibit a charge/discharge pattern.

Referring now to FIG. 4, an embodiment of a method 400 for charging a battery is illustrated. As discussed below, the systems and methods of the present disclosure provide for the charging of a battery subsystem in a manner that causes the battery subsystem to "learn" and exhibit a desired charge/discharge pattern in place of an existing charge/discharge pattern. For example, charge/discharge cycles performed by a battery subsystem are monitored to identify a first charge/discharge pattern exhibited by that battery subsystem. A charging schedule may then be determined that will cause the battery subsystem to exhibit a desired second charge/discharge pattern that is different than the first charge/discharge pattern, and that charging schedule is applied to the battery subsystem via a battery charging subsystem to cause the battery subsystem to exhibit the desired second charge/discharge pattern. Furthermore, the desired second charge/discharge pattern may correspond to a desired use of a device to which the battery subsystem provides power, and the charging schedule that provides that desired second charge/discharge pattern may be determined based on user scheduling information (e.g., a user calendar) that is indicative of that desired use of the device. The application of the charging schedule to cause the battery subsystem to exhibit the desired second charge/discharge pattern may include automatically charging the battery subsystem via a wired battery charging subsystem (e.g., via the automatic opening and closing of a charging circuit) or a wireless battery charging subsystem (e.g., via the receiving or preventing of the transmission of power from a quasistatic cavity resonance transmitter device to a quasistatic cavity resonance receiver device in the wireless battery charging subsystem.) As such, the useful lifetime of battery subsystems is extended, and the operation of battery subsystems is enhanced, providing for enhancements to the user experience with devices powered by such battery subsystems.

The method 400 begins at block 402 where a battery charging determination subsystem monitors charge/discharge cycles performed by a battery subsystem. In an embodiment, at block 402, the battery charging determination engine 304 in the user device 202/300 may monitor the battery charging subsystem 310 and/or the battery subsystem 312 in order to monitor charge/discharge cycles performed by the battery subsystem 312. Furthermore, in some embodiments, the battery charging determination engine 304 in the user device 202/300 may operate in conjunction with the battery charging determination system 206 (e.g., via the communication subsystem 308 and through the network 204) in order to allow the battery charging determination system 206 to monitor the charge/discharge cycles performed by the battery subsystem 312. For example, the battery charging determination engine 304 in the user device 202/300 may report any information about charge/discharge cycles performed by the battery subsystem 312 via the communication subsystem 308 and through the network 204 to the battery charging determination system 206 in order to allow the battery charging determination system 206 to perform the battery charging determination functionality discussed below.

Techniques for monitoring charge/discharge cycles of a battery subsystem are described by inventors of the present disclosure in U.S. patent application Ser. No. 15/974,761, filed on May 9, 2018 and the disclosure of which is incorporated herein by reference, and thus are not repeated herein in detail. However, one of skill in the art in possession of the present disclosure will recognize that the battery subsystem 312 may be provided in the user device 300 with a first charge/discharge pattern that is "learned" by that battery subsystem 312 during the manufacture of the user device 300. For example, the battery subsystem 312 may be subject to charging schedules and discharging during manufacture in the user device factory, and thus may be provided to a user exhibiting the first charge/discharge pattern discussed above. However, one of skill in the art in possession of the present disclosure will recognize that the first charge/discharge pattern discussed herein may be "learned" by the battery subsystem 312 based on a charging schedule provided by a user of the user device 300 (e.g., based on any repeated charging activity that the battery subsystem/user device is subjected to by the user of the user device.)

As such, at block 402, the battery charging determination engine 304 in the user device 202/300 may monitor the battery charging subsystem 310 and/or the battery subsystem 312 over any plurality of charge/discharge cycles, and may record information about those charge/discharge cycles in the battery charging determination database 306. Using experimental examples discussed in U.S. patent application Ser. No. 15/974,761, the monitoring of the battery subsystem 312 by the battery charging determination engine 304 may identify a plurality of battery charge/discharge cycles that provide for charging the battery subsystem 312 from 11:00 pm each evening to 5:30 am each morning on consecutive days, and the corresponding discharge of that battery subsystem 312 between 6:00 am and 10:00 pm on those days, with that discharge monitoring including the recording of battery subsystem charge levels at multiple times between 6:00 am and 10:00 pm (e.g., 6:00 am, 10:00 am, 2:00 pm, 6:00 pm, and 10:00 pm in the example provided in U.S. patent application Ser. No. 15/974,761.) However, while a specific example of the monitoring of the charge/discharge cycles for the battery subsystem 312 has been described, one of skill in the art in possession of the present disclosure will recognize that such monitoring may be performed in a variety of other manners that will fall within the scope of the present disclosure as well. Thus, following block 402 of the method 400, the battery charging determination database 306 (and/or a similar database in the battery charging determination system 206) may include information about any number of charge/discharge cycles recorded for the battery subsystem 312.

The method 400 then proceeds to block 404 where the battery charging determination subsystem identifies a first charge/discharge pattern exhibited by a battery subsystem. In an embodiment, at block 404, the battery charging determination engine 304 in the user device 202/300 (and/or the battery charging determination system 206) operates to analyze the information about the charge/discharge cycles that were recorded for the battery subsystem 312 at block 402 and stored in the battery charging determination database 306 (and/or similar database in the battery charging determination system 206) in order to identify the first charge/discharge pattern exhibited by the battery subsystem 312. As discussed above, the first charge/discharge pattern exhibited by the battery subsystem 312 may be a charge/discharge pattern that was "learned" by the battery subsystem 312 during the manufacture of the user device 300, a charge/discharge pattern that was "learned" by the battery subsystem 312 based on charging activity performed by a user of the user device 300, and/or charge/discharge pattern that was "learned" by the battery subsystem 312 in a variety of other manners that would be apparent to one of skill in the art in possession of the present disclosure.

Techniques for identifying charge/discharge patterns of a battery subsystem are described by inventors of the present disclosure in U.S. patent application Ser. No. 15/974,761, filed on May 9, 2018 and the disclosure of which is incorporated herein by reference, and thus are not repeated herein in detail. However, with reference to experimental examples discussed in U.S. patent application Ser. No. 15/974,761, the first charge/discharge pattern may include the charging of the battery subsystem 312 from 11:00 pm each evening to 5:30 am each morning on consecutive days, and the corresponding discharge of that battery subsystem 312 between 6:00 am and 10:00 pm on those days to provide the battery subsystem 312 with approximately 100% charge at 6:00 am each of those days, approximately 90% charge at 10:00 am each of those days, approximately 70% charge at 2:00 pm each of those days, approximately 40% charge at 6:00 pm each of those days, and approximately 20% charge at 10:00 pm each of those days. However, one of skill in the art in possession of the present disclosure will recognize that charge/discharge patterns determined for the battery subsystem 312 will vary based on the time period that battery subsystem 312 is charged, and thus the first charge/discharge pattern determined for that battery subsystem 312 at block 404 may include any of a variety of discharge patterns (i.e., the charge levels over time discussed in the example above) that are associated with charging activity/charging schedule that the battery subsystem is subject to.

The method 400 may then proceed to optional block 406 where the battery charging determination subsystem may retrieve user scheduling information. In an embodiment, at block 406, the battery charging determination engine 304 in the user device 202/300 may operate to access the user scheduling subsystem 316 in order to retrieve user scheduling information. In some embodiments, the user scheduling information retrieved by the battery charging determination engine 304 in the user device 202/300 at optional block 406 may be provided via its communication subsystem 308 and through the network 204 to the battery charging determination system 206. As discussed above, the user scheduling subsystem 316 may include a user calendar application in which a user of the user device 300 provides user scheduling information that is indicative of a future use of the user device 300. For example, the user of the user device 202/300 may have utilized the user calendar application to record a scheduled meeting, a plane flight, a work period, and/or any other calendar event that one of skill in the art in possession of the present disclosure would recognize may be interpreted as being indicative of a situation in which the user device 202/300 may be used (and, in particular, may be used via power provided by the battery subsystem 312.) However, one of skill in the art in possession of the present disclosure will recognize that the user scheduling subsystem 316 may include any subsystem including any information that may be indicative of a user of the user device 300/battery subsystem 312, including email applications (e.g., in which plane flight confirmation are received, meetings are scheduled, work periods are discussed, etc.), airline applications (e.g., in which plane flight details are created and/or verified), messaging applications (e.g., in which plane flights are discussed, meetings are discussed, work periods are discussed, etc.), and/or any other user device subsystem capable of including user scheduling information that would be recognized by one of skill in the art in possession of the present disclosure as falling with the scope of the present disclosure.

As such, in some embodiments of optional block 406, the battery charging determination engine 304 in the user device 202/300 (and/or the battery charging determination system 206) may analyze any user scheduling information included in the user scheduling subsystem 316 in order to determine if that user scheduling information is indicative of a use of the user device 202/300 (and, in particular examples, a use of the user device 202/300 that may require power from the battery subsystem 312.) In specific examples, the analysis performed at optional block 406 may identify that the user of the user device has an upcoming meeting scheduled, and one of skill in the art in possession of the present disclosure will recognize how such a scheduled meeting may be indicative that the user device 202/300 (and thus the battery subsystem 312 in the user device 202/300) will be used during the time period that meeting is scheduled. In another specific example, the analysis performed at optional block 406 may identify that the user of the user device has an upcoming plane flight, and one of skill in the art in possession of the present disclosure will recognize how such a plane flight may be indicative that the user device 202/300 (and thus the battery subsystem 312 in the user device 202/300) will be used during the time period that plane flight is scheduled. In yet another specific example, the analysis performed at optional block 406 may identify that the user of the user device has set aside a time period for working on a matter, and one of skill in the art in possession of the present disclosure will recognize how such scheduled work may be indicative that the user device 202/300 (and thus the battery subsystem 312 in the user device 202/300) will be used during the time period that work is schedule. However, while a few specific examples have been provided, one of skill in the art in possession of the present disclosure will recognize that a wide variety of user scheduling information may be identified from the analysis performed at optional block 406 while remaining within the scope of the present disclosure as well.

The method 400 then proceeds to block 408 where the battery charging determination subsystem determines a charging schedule that will cause the battery subsystem to exhibit a second charge/discharge pattern. In an embodiment, at block 408, the battery charging determination engine 304 in the user device 202/300 (and/or the battery charging determination system 206) may operate to determine a charging schedule for the battery subsystem 312 that will cause the battery subsystem 312 to exhibit a second charge/discharge pattern that is different than the first charge/discharge pattern that was identified at block 404. As will be appreciated by one of skill in the art in possession of the present disclosure, the second charge/discharge pattern enabled by the charging schedule determined at block 408 may be selected for the battery subsystem 312 based on a variety of factors.

In one embodiment, the second charge/discharge pattern may be selected for the battery subsystem 312 at block 408 based on that second charge/discharge pattern providing at least one benefit over the first charge/discharge pattern. For example, the first charge/discharge pattern discussed in the example provided above with reference to block 404 includes repeated charging of the battery subsystem 312 from 11:00 pm to 5:30 am, and at block 408 the battery charging determination engine 304 in the user device 202/300 (and/or the battery charging determination system 206) may determine a charging schedule that lowers the charging duration in the first charge/discharge pattern (e.g., 6.5 hours) while providing a discharge pattern that satisfies the needs of the user, which one of skill in the art in possession of the present disclosure will recognize may provide a second charge/discharge pattern that extends the life of the battery subsystem 312 (e.g., due to its lower charging duration.)

With reference to experimental examples discussed in U.S. patent application Ser. No. 15/974,761, the second charge/discharge pattern may include a charging schedule that provides for the charging of the battery subsystem 312 from 10:30 am to 12:00 pm on consecutive days, which as discussed in those examples allows the battery subsystem 312 to "learn" that second charge/discharge pattern after some number of charge/discharge cycles that will provide for the corresponding discharge of that battery subsystem 312 between 2:00 pm and 10:00 am on those days to provide the battery subsystem 312 with approximately 90% charge at 2:00 pm each of those days, approximately 70% charge at 6:00 pm each of those days, approximately 50% charge at 10:00 pm each of those days, approximately 40% charge at 6:00 am each of those days, and approximately 20% charge at 10:00 am each of those days. As such, the second charge/discharge pattern provided via the charging schedule determined at block 408 may reduce the charging duration of the battery subsystem 312 from 6.5 hours to 1.5 hours, while continuing to provide sufficient charge levels needed by the user to utilize the user device 202/300. As would be appreciated by one of skill in the art in possession of the present disclosure, reduction of the charging duration of the battery subsystem 312 may increase the useful life of the battery subsystem 312 by preventing unnecessary charging of the battery subsystem 312, resulting in proper battery subsystem utilization that improves the health and performance of the battery subsystem 312. However, while a specific example has been provided, one of skill in the art in possession of the present disclosure will recognize that a variety of different charging schedules will provide second charge/discharge patterns that provide a variety of different benefits for the battery subsystem 312 (i.e., relative to the first charge/discharge pattern) while remaining within the scope of the present disclosure as well.

In another embodiment, and in particular when optional block 406 is performed to retrieve the user scheduling information discussed above, the second charge/discharge pattern may be selected for the battery subsystem 312 at block 408 based on that second charge/discharge pattern providing for a use of the user device 300/battery subsystem 312 that was indicated by the analysis of the user scheduling information discussed above. For example, the second charge/discharge pattern may be selected in order to ensure that the battery subsystem 312 has a desired charge level that will satisfy the use of the user device 300/battery subsystem 312 that was indicated by the analysis of the user scheduling information discussed above. In a specific example, the first charge/discharge pattern may not provide sufficient battery charge level(s) (or battery charge level(s) that may not be ideal) for the scheduled meeting, plane flight, or work period that was indicated by the analysis of the user scheduling information discussed above. As such, at block 408 the battery charging determination engine 304 in the user device 202/300 (and/or the battery charging determination system 206) may determine a charging schedule that provides for a second charge/discharge pattern that will provide sufficient battery charge level(s) (or battery charge level(s) that are higher than those provided by the first charge/discharge pattern) for the scheduled meeting, plane flight, or work period that was indicated by the analysis of the user scheduling information discussed above.

With reference to experimental examples discussed in U.S. patent application Ser. No. 15/974,761, the first charge/discharge pattern identified at block 404 may be provided by charging the battery subsystem from 10:30 am to 12:00 pm on consecutive days, which as discussed in those examples allows the battery subsystem 312 to "learn" that charge/discharge pattern after some number of charge/discharge cycles that will provide for the corresponding discharge of that battery subsystem 312 between 2:00 pm and 10:00 am on those days to provide the battery subsystem 312 with approximately 90% charge at 2:00 pm each of those days, approximately 70% charge at 6:00 pm each of those days, approximately 50% charge at 10:00 pm each of those days, approximately 40% charge at 6:00 am each of those days, and approximately 20% charge at 10:00 am each of those days. However, the analysis of the user scheduling information at optional block 408 may indicate that the user has the scheduled meeting, plane flight, or work period between 9:00 am and 1:00 pm on a day that may be at least a few days in the future.

As such, at block 408 the battery charging determination engine 304 in the user device 202/300 (and/or the battery charging determination system 206) may determine a charging schedule (e.g., the charging schedule discussed in U.S. patent application Ser. No. 15/974,761 that provides for the charging of the battery subsystem 312 between 11:00 pm and 5:30 am, and is associated with a discharge of that battery subsystem 312 between 6:00 am and 10:00 pm on those days to provide the battery subsystem 312 with approximately 100% charge at 6:00 am each of those days, approximately 90% charge at 10:00 am each of those days, and approximately 70% charge at 2:00 pm each of those days) which will provide for a second charge/discharge pattern that will provide sufficient battery charge level(s) (or battery charge level(s) that are higher than those provided by the first charge/discharge pattern) for the scheduled meeting, plane flight, or work period between 9:00 am and 1:00 pm. While one of skill in the art in possession of the present disclosure will recognize that the examples of the first charge/discharge pattern and the second charge/discharge pattern provided above both appear to provide sufficient battery charge levels for the use of the user device 300/battery subsystem 312 indicated by the user scheduling information (e.g., between 9:00 am and 1:00 pm), such uses (e.g., the scheduled meeting, plane flight, or work period) may be associated with higher than normal use of the user device 300/battery subsystem 312, and thus the higher battery subsystem charge levels enabled by the second charge/discharge pattern may be preferable, and in many situations will provide for the use of the user device 300 when the first charge/discharge pattern will not (as that higher than normal use of the user device 300/battery subsystem 312 will deplete the lower battery subsystem charge levels provided by the first charge/discharge pattern.) However, while a specific example has been provided, one of skill in the art in possession of the present disclosure will recognize that the charging schedule that provides second charge/discharge pattern may be determined to enable a variety of uses of the user device 300/battery subsystem 312 in manner that provides improvements over the first charge/discharge pattern while remaining within the scope of the present disclosure as well.

While two specific examples have been provided, one of skill in the art in possession of the present disclosure will recognize that the concepts described in those examples may be combined in determining the charging schedule that provides the second charge/discharge pattern. As such, the charging schedule that provides the second charge/discharge pattern may be determined to enable a use of the user device 300/battery subsystem 312 indicated by user scheduling information, while also providing for enhanced/optimized use of that battery subsystem. In some embodiments, prior testing of the battery subsystem 312 (e.g., during the manufacturing of the user device 300) may have determined and associated a variety of different charging schedules with their respective charge/discharge patterns, and those associations may be stored in the battery charge determination database 306 in the user device 202/300 (and/or in a similar database in the battery charging determination system 206) for use by the battery charging determination engine 304 in the user device 202/300 (and/or the battery charging determination system 206) in determining the charging schedule at block 408. However, rather than actual physical testing of the battery subsystem 312 (e.g., by repeated charging of the battery subsystem 312 over different time periods and then operating the user device 300 via power from the battery subsystem 312 as described in U.S. patent application Ser. No. 15/974,761), mathematical, predictive, and/or theoretical models of the charge/discharge patterns that may be exhibited by the user device 300/battery subsystem 312 may be utilized in some embodiments to determine the charging schedule at block 408.

Furthermore, in other embodiments, the association of different charging schedules with their respective charge/discharge patterns may be determined by the battery charging determination engine 304 in the user device 202/300 (and/or the battery charging determination system 206) during, for example, monitoring of that battery subsystem 312 that is similar to that described above with reference to block 402, but that is performed over the lifetime of the battery subsystem 312. As such, those associations may be stored in the battery charge determination database 306 in the user device 202/300 (and/or in a similar database in the battery charging determination system 206) by the battery charging determination engine 304 in the user device 202/300 (and/or the battery charging determination system 206) as they are determined, and then used during the method 400 to determine the charging schedule at block 408. While a variety of techniques for determining different charging schedules and their associated charge/discharge patterns have been described, one of skill in the art in possession of the present disclosure will recognize that the charging schedules and their associated charge/discharge patterns described herein may be determined in a variety of manners that will fall within the scope of the present disclosure as well.

The method 400 may then proceed to optional block 410 where the battery charging determination subsystem may provide an identification of the charging schedule for display. In an embodiment, at optional block 410, the battery charging determination engine 304 in the user device 202/300 (and/or the battery charging determination system 206) may generate and transmit an identification of the charging schedule for display on the display subsystem 314. For example, at optional block 410 the battery charging determination engine 304 may generate a graphical user interface and/or graphical user element that includes an identification of the charging schedule determined at block 408, and transmit it to the display subsystem 314 such that it is displayed to the user of the user device 300. In another example, at optional block 410 the battery charging determination system 206 may generate a graphical user interface and/or graphical user element that includes an identification of the charging schedule determined at block 408, and transmit it over the network 204 to the user device 300 such that the battery charging determination engine 304 receives it through its communication subsystem 308 and transmits it to the display subsystem 314 for display to the user of the user device 300. While a few examples have been described, one of skill in the art in possession of the present disclosure will recognize that the identification of the charging schedule determined at block 408 may be displayed to a user at optional block 410 in a variety of manners that will fall within the scope of the present disclosure as well.

In a specific example, the identification of the charging schedule determined at block 408 and displayed to a user at optional block 410 (e.g., via a "pop-up" window, an email, a text message, and/or other graphical element) may provide a suggestion to the user to implement the charging schedule such as, for example, "It has been determined that the life of your battery may be extended by changing your daily charging schedule from 11:00 pm-5:30 am to 10:30 am-12:00 pm", "You have a scheduled meeting/plane flight/work period coming up in a few days, you can ensure that you have sufficient battery life during that time if you change your daily charging schedule from 10:30 am-12:00 pm to 11:00 pm-5:30 am", "Your device has been connected to a power supply, but it has been determined that your battery should not be charged at the current time if you want it to operate optimally", and/or any other suggestion that would be apparent to one of skill in the art in possession of the present disclosure. Furthermore, in some examples, the identification of the charging schedule determined at block 408 and displayed to a user at optional block 410 may also be accompanied by a graphical element that allows the user to implement the charging schedule (e.g., in the manner described below) via, for example, a graphical button to "enable suggested charging schedule" and a graphical button to "decline suggested charging schedule". However, while discussed as being identified to the user of the user device 202/300, in other embodiments optional block 410 may be skipped, and the charging schedule determined at block 408 may be automatically enabled following its determination at block 408. For example, the user of the user device 202/300 may authorize the enablement of any charging schedules determined by the battery charging determination engine 304 in the user device 202/300 (and/or the battery charging determination system 206) prior to the performance of the method 400.

The method 400 then proceeds to block 412 where the battery charging determination subsystem applies the charging schedule to the battery subsystem to cause the battery subsystem to exhibit the second charge/discharge pattern. In an embodiment, at block 412, the battery charging determination engine 304 in the user device 202/300 (and/or the battery charging determination system 206) may cause the battery charging subsystem 310 to charge the battery subsystem 312 according to the charging schedule determined at block 408 in order to cause the battery subsystem 312 to exhibit the second charge/discharge pattern discussed above. As discussed above, in situations where optional block 410 is performed, the application of the charging schedule to the battery subsystem may be performed in response to an instruction from the user of the user device (e.g., a selection of the graphical button to "enable suggested charging schedule"). However, in other embodiments, the charging schedule may be applied automatically following its determination at block 408.

For example, at block 412 the battery charging determination engine 304 may provide instructions, program, and/or otherwise cause the battery charging subsystem 310 to charge the battery subsystem 312 according to the charging schedule determined at block 408. In another example, at optional block 410 the battery charging determination system 206 may generate instructions that are configured to cause the battery subsystem 312 to exhibit the second charge/discharge pattern discussed above, and transmit them over the network 204 to the user device 300 such that the battery charging determination engine 304 receives them through its communication subsystem 308 and uses them to program and/or otherwise cause the battery charging subsystem 310 to charge the battery subsystem 312 according to the charging schedule determined at block 408. While a few examples have been described, one of skill in the art in possession of the present disclosure will recognize that the application of the charging schedule determined at block 408 to the battery subsystem 312 may be performed in a variety of manners that will fall within the scope of the present disclosure as well.

In a specific example, the battery charging subsystem 310 may be wired battery subsystem and, as such, may include a charging circuit that is configured to allow power from a power supply (not illustrated, but which may be coupled to the battery charging subsystem 310 in order to allow the battery charging subsystem 310 to charge the battery subsystem 312) to be provided to the battery subsystem 312. As such, the causing the battery charging subsystem 310 to charge the battery subsystem 312 according to the charging schedule determined at block 408 may include instructions and/or programming that provides for the automatic closing of the charging circuit to allow power from a power supply to be provided to the battery subsystem 312 during times in which the charging schedule calls for charging of the battery subsystem 312, while providing for the automatic opening of the charging circuit to prevent power from a power supply from being provided to the battery subsystem 312 during times in which the charging schedule does not call for charging of the battery subsystem 312. Thus, the battery charging subsystem 310 may be configured to interrupt charging of the battery subsystem 312 even when the user device 202/300 is "plugged in" in a manner that would provide for charging of the battery subsystem 312 in a conventional user device.

In a another specific example, the battery charging subsystem 310 may be wireless battery subsystem and, as such, may include a quasistatic cavity resonance receiver device that is configured to receive power from a quasistatic cavity resonance transmitter device that is coupled to a power supply (not illustrated, but which may be coupled to the quasistatic cavity resonance transmitter device in order to allow the quasistatic cavity resonance transmitter device to wirelessly transmit power) and provide that power to the battery subsystem 312. As such, the causing the battery charging subsystem 310 to charge the battery subsystem 312 according to the charging schedule determined at block 408 may include instructions and/or programming that provides for the receiving of power by the quasistatic cavity resonance receiver device from the quasistatic cavity resonance transmitter device, and the provisioning of that power to the battery subsystem 312 during times in which the charging schedule calls for charging of the battery subsystem 312, while the preventing power transmission by the quasistatic cavity resonance transmitter device to the quasistatic cavity resonance receiver device and/or the preventing of the provisioning of that power to the battery subsystem 312 during times in which the charging schedule does not call for charging of the battery subsystem 312. While a few examples have been described, one of skill in the art in possession of the present disclosure will recognize that the battery charging subsystem 310 may apply the charging schedule to the battery subsystem 312 in a variety of manners that will fall within the scope of the present disclosure as well.

As such, following block 412 of the method 400, the battery charging subsystem 310 will charge the battery subsystem 312 according to the charging scheduled applied at block 412, which will cause the battery subsystem 312 to learn the second charge/discharge pattern discussed above.

As discussed above, it has been found that batteries take an average approximately three charge cycles to learn a new charge/discharge pattern and, as such, in some embodiments, the battery charging subsystem 310 may charge the battery subsystem 312 for at least three charge/discharge cycles before the battery subsystem 312 exhibits the second charge/discharge pattern. Thus, in some embodiments, the charge schedule determined at block 408 based on user scheduling information retrieved at optional block 406 may be applied to allow for three or more charging cycles prior to the event identified in the user scheduling information. However, more or fewer charge/discharge cycles may cause the battery subsystem 312 to exhibit the second charge/discharge pattern while falling within the scope of the present disclosure, and in some embodiments a single charge/discharge cycle (or fewer than three charge/discharge cycles) according to a new charging schedule may cause the battery subsystem 312 to exhibit desired discharge behavior (e.g., behavior that is close (or "close enough") to second charge/discharge pattern) while remaining within the scope of the present disclosure as well.

Thus, systems and methods have been described that provide for the charging of a battery subsystem in a manner that causes the battery subsystem to "unlearn" current charge/discharge behavior and exhibit a new, desired charge/discharge behavior. For example, charge/discharge cycles associated with a battery subsystem may be monitored to identify a first charge/discharge pattern exhibited by that battery subsystem, and a charging schedule may then be determined that will cause the battery subsystem to exhibit a desired second charge/discharge pattern that is different than the first charge/discharge pattern. That charging schedule may then be applied to the battery subsystem via a battery charging subsystem to cause the battery subsystem to exhibit the desired second charge/discharge pattern. In some examples, the desired second charge/discharge pattern may correspond to a desired use of a device to which the battery subsystem provides power, and the charging schedule that provides that desired second charge/discharge pattern may be determined based on user scheduling information (e.g., a user calendar) that is indicative of that desired use of the device. The application of the charging schedule to cause the battery subsystem to exhibit the desired second charge/discharge pattern may include automatically charging the battery subsystem via a wired battery charging subsystem (e.g., via the automatic opening and closing of a charging circuit) or a wireless battery charging subsystem (e.g., via the receiving or preventing of the transmission of power from a quasistatic cavity resonance transmitter device to a quasistatic cavity resonance receiver device in the wireless battery charging subsystem.) As such, the useful lifetime of battery subsystems is extended, and the operation of battery subsystems is enhanced, providing for enhancements to the user experience with devices powered by such battery subsystems Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A charge/discharge pattern battery training system, comprising:
    a battery charging subsystem;
    a battery subsystem that is connected to the battery charging subsystem;
    a battery charging determination engine that is coupled to the battery charging subsystem, wherein the battery charging determination engine is configured to:
        monitor a plurality of charge/discharge cycles performed by the battery subsystem;
        identify, based on the plurality of charge/discharge cycles performed by the battery subsystem, a first charge/discharge pattern exhibited by the battery subsystem;
        determine a charging schedule that is configured to be applied to the battery subsystem during a common time period for two or more consecutive days in order to cause the battery subsystem to exhibit a second charge/discharge pattern that is different than the first charge/discharge pattern and a third charge/discharge pattern that occurs during the common time period on a first day of the two or more consecutive days, wherein the second charge/discharge pattern occurs on a second day of the two or more consecutive days that is subsequent to the first day; and
        determine that the second charge/discharge pattern has a charge duration that is lower than the first charge/discharge pattern and that is configured to optimize a life of the battery subsystem while satisfying a demand of the battery subsystem and, in response, apply, via the battery charging subsystem, the charging schedule to the battery subsystem that causes the battery subsystem to exhibit the second charge/discharge pattern.

2. The system of claim 1, further comprising:
a display subsystem that is coupled to the battery charging determination engine, wherein the battery charging determination engine is configured to:
    provide, for display on the display subsystem, an identification of the charging schedule.

3. The system of claim 1, further comprising:
a user scheduling subsystem that is coupled to the battery charging determination engine, wherein the battery charging determination engine is configured to:
    retrieve, from the user scheduling subsystem, user scheduling information that is associated with a use of the battery subsystem, wherein the charging schedule is determined based on the user scheduling information.

4. The system of claim 3, wherein the user scheduling subsystem includes a user calendar, and wherein the user scheduling information that is associated with the use of the battery subsystem is indicative of a use of a device to which the battery subsystem provides power.

5. The system of claim 1, wherein the battery charging subsystem is a wired battery charging subsystem that is configured to connect to a power supply via a cable, and wherein the applying the charging schedule to the battery subsystem includes:
    automatically providing for charging of the battery subsystem by closing a charging circuit in the battery charging subsystem based on the charging schedule; and
    automatically preventing charging of the battery subsystem by opening a charging circuit in the battery charging subsystem based on the charging schedule.

6. The system of claim 1, wherein the battery charging subsystem is a wireless battery charging subsystem that includes a quasistatic cavity resonance receiver device, and wherein the applying the charging schedule to the battery subsystem includes:
    automatically providing for charging of the battery subsystem by receiving, via the quasistatic cavity resonance receiver device, power from a quasistatic cavity resonance transmitter device based on the charging schedule; and automatically preventing charging of the battery subsystem by preventing power transmission from the quasistatic cavity resonance transmitter device to the quasistatic cavity resonance receiver device based on the charging schedule.

7. An Information Handling System (IHS), comprising:

a processing system; and a memory system that is coupled to the processing system and that includes instructions that, when executed by the processing system, cause the processing system to provide a battery charging determination engine that is configured to:

monitor a plurality of charge/discharge cycles performed by a battery subsystem;

identify, based on the plurality of charge/discharge cycles performed by the battery subsystem, a first charge/discharge pattern exhibited by the battery subsystem;

determine a charging schedule that is configured to be applied to the battery subsystem during a common time period for two or more consecutive days in order to cause the battery subsystem to exhibit a second charge/discharge pattern that is different than the first charge/discharge pattern and a third charge/discharge pattern that occurs during the common time period on a first day of the two or more consecutive days, wherein the second charge/discharge pattern occurs on a second day of the two or more consecutive days that is subsequent to the first day; and determine that the second charge/discharge pattern of the charging schedule has a charge duration that is lower than the first charge/discharge pattern and that is configured to optimize a life of the battery subsystem while satisfying a demand of the battery subsystem and, in response, apply, via a battery charging subsystem that is connected to the battery subsystem, the charging schedule to the battery subsystem that causes the battery subsystem to exhibit the second charge/discharge pattern.

8. The IHS of claim 7, wherein the battery charging determination engine is configured to:

provide, for display on a display subsystem, an identification of the charging schedule.

9. The IHS of claim 7, wherein the battery charging determination engine is configured to:

retrieve, from a user scheduling subsystem, user scheduling information that is associated with a use of the battery subsystem, wherein the charging schedule is determined based on the user scheduling information.

10. The IHS of claim 9, wherein the user scheduling subsystem includes a user calendar, and wherein the user scheduling information that is associated with the use of the battery subsystem is indicative of a use of a device to which the battery subsystem provides power.

11. The IHS of claim 7, wherein the battery subsystem is a wired battery subsystem, and wherein the applying the charging schedule to the battery subsystem includes:

automatically providing for charging of the battery subsystem by closing a charging circuit in the battery charging subsystem based on the charging schedule; and automatically preventing charging of the battery subsystem by opening a charging circuit in the battery charging subsystem based on the charging schedule.

12. The IHS of claim 7, wherein the battery charging subsystem is a wireless battery charging subsystem, and wherein the applying the charging schedule to the battery subsystem includes:

automatically providing for charging of the battery subsystem by receiving, via a quasistatic cavity resonance receiver device, power from a quasistatic cavity resonance transmitter device based on the charging schedule; and automatically preventing charging of the battery subsystem by preventing power transmission from the quasistatic cavity resonance transmitter device to the quasistatic cavity resonance receiver device based on the charging schedule.

13. The IHS of claim 7, wherein the applying the charging schedule to the battery subsystem that causes the battery subsystem to exhibit the second charge/discharge pattern includes performing at least three charge/discharge cycles on the battery subsystem according to the charging schedule to cause the battery subsystem to exhibit the second charge/discharge pattern.

14. A method for training a battery to exhibit a charge/discharge pattern, comprising:

monitoring, by a battery charging determination subsystem, a plurality of charge/discharge cycles performed by a battery subsystem;

identifying, by the battery charging determination subsystem based on the plurality of charge/discharge cycles performed by the battery subsystem, a first charge/discharge pattern exhibited by the battery subsystem;

determining, by the battery charging determination subsystem, a charging schedule that is configured to be applied to the battery subsystem during a common time period for two or more consecutive days in order to cause the battery subsystem to exhibit a second charge/discharge pattern that is different than the first charge/discharge pattern and a third charge/discharge pattern that occurs during the common time period on a first day of the two or more consecutive days, wherein the second charge/discharge pattern occurs on a second day of the two or more consecutive days that is subsequent to the first day; and determining, by the battery changing determination subsystem, that the second charge/discharge pattern has a charge duration that is lower than the first charge/discharge pattern and that is configured to optimize a life of the battery subsystem while satisfying a demand of the battery subsystem and, in response, applying, by the battery charging determination subsystem via a battery charging subsystem that is connected to the battery subsystem, the charging schedule to the battery subsystem that causes the battery subsystem to exhibit the second charge/discharge pattern.

15. The method of claim 14, further comprising:

providing, by the battery charging determination subsystem for display on a display subsystem, an identification of the charging schedule.

16. The method of claim 14, further comprising:

retrieving, by the battery charging determination subsystem from a user scheduling subsystem, user scheduling information that is associated with a use of the battery subsystem, wherein the charging schedule is determined based on the user scheduling information.

17. The method of claim 16, wherein the user scheduling subsystem includes a user calendar, and wherein the user scheduling information that is associated with the use of the battery subsystem is indicative of a use of a device to which the battery subsystem provides power.

18. The method of claim 14, wherein the battery subsystem is a wired battery subsystem, and wherein the applying the charging schedule to the battery subsystem includes:
- automatically providing for charging of the battery subsystem by closing a charging circuit in the battery charging subsystem based on the charging schedule; and
- automatically preventing charging of the battery subsystem by opening a charging circuit in the battery charging subsystem based on the charging schedule.

19. The method of claim 14, wherein the battery charging subsystem is a wireless battery charging subsystem, and wherein the applying the charging schedule to the battery subsystem includes:
- automatically providing for charging of the battery subsystem by receiving, via a quasistatic cavity resonance receiver device, power from a quasistatic cavity resonance transmitter device based on the charging schedule; and
- automatically preventing charging of the battery subsystem by preventing power transmission from the quasistatic cavity resonance transmitter device to the quasistatic cavity resonance receiver device based on the charging schedule.

20. The method of claim 14, wherein the applying the charging schedule to the battery subsystem that causes the battery subsystem to exhibit the second charge/discharge pattern includes performing at least three charge/discharge cycles on the battery subsystem according to the charging schedule to cause the battery subsystem to exhibit the second charge/discharge pattern.

* * * * *